Figure 1:
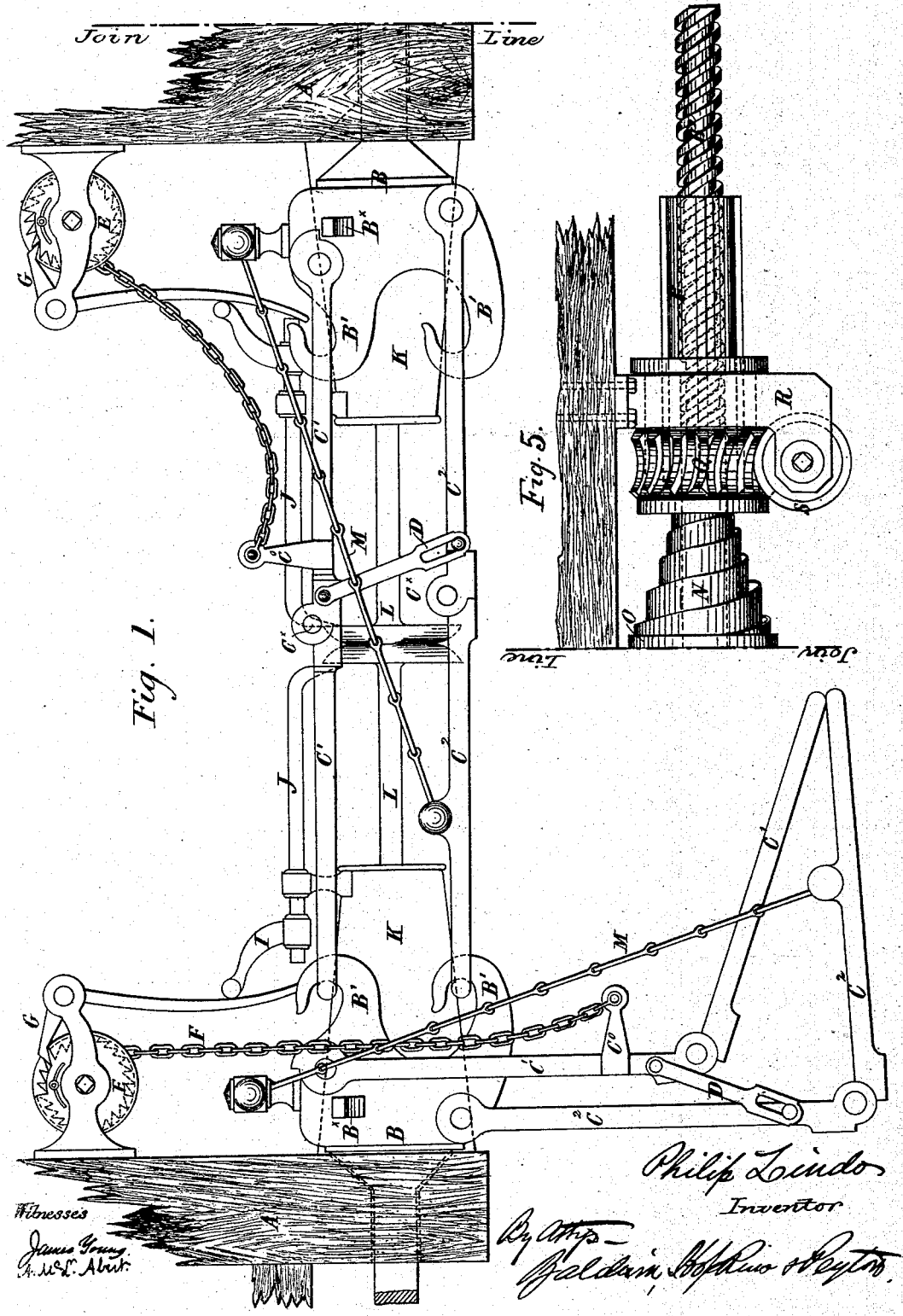

(No Model.) P. LINDO. 2 Sheets—Sheet 2.
CAR COUPLING.
No. 325,947. Patented Sept. 8, 1885.

Witnesses.
James Young.
A. McAbel.

Philip Lindo,
Inventor
By Attys

UNITED STATES PATENT OFFICE.

PHILIP LINDO, OF DELFT, HOLLAND.

CAR-COUPLING.

SPECIFICATION forming part of Letters Patent No. 325,947, dated September 8, 1885.

Application filed March 27, 1885. (No model.) Patented in England January 15, 1885, No. 605; in Belgium March 14, 1885, No. 68,194; in Italy March 30, 1885, No. 18,144, and in Austria May 26, 1885, No. 11,312.

*To all whom it may concern:*

Be it known that I, PHILIP LINDO, a subject of the Queen of Great Britain, residing at Delft, Holland, engineer, have invented certain new and useful Improvements in Apparatus for Coupling Railway-Carriages, (for which I have obtained Letters Patent in Belgium, No. 68,194, dated March 14, 1885; in Italy, No. 18,144, dated March 30, 1885, and in Austria, No. 11,312, dated May 26, 1885,) of which the following is a specification.

My apparatus comprises adjustable spring draw-bars and coupling-links. The arrangement is similar at each end of each of the carriages or vehicles. The draw-bar has a pair of hooks formed upon its head, one beneath the other, and the links to engage with the hooks of the draw-bar are also double, so that in the case of the breakage of one link the carriage nevertheless remains securely coupled. The use of double coupling-links admits of the usual side chains being safely dispensed with. The upper coupling-link of the pair is jointed to the head of the draw-bar immediately in rear of the upper hook, which it spans, the hook being between the two side bars of the link. The link is of a length suitable to engage with the upper hook of the draw-bar of the next carriage or vehicle. Midway in its length the link is provided with a rule-joint, which admits of its folding to a V form. The lower link of the pair is similar to the upper link, and is jointed to the draw-bar in rear of its lower hook. This link engages with the lower hook on the draw-bar of the opposite carriage or vehicle. The two links forming a pair are connected together by a small slotted connecting-piece attached by a pin to each close to the central joint on the part of the link next to the draw-bar. Thus in the operation of coupling it is not necessary to raise the two links separately, but when the upper link is raised it brings up the lower with it. This raising of the links for coupling is effected by means of chains attached to the inner joint or portion of the upper link and passing to a barrel mounted on the end of the carriage or vehicle. The barrel can be turned by a handle at the end of its axis, so that it is not necessary to enter between the carriages in coupling up and uncoupling the vehicles forming the train.

When the carriages or vehicles are uncoupled, the links hang down from the head of the draw-bar, the first joints taking a vertical or nearly vertical position, while the outer joints are supported horizontally, or nearly so, by light suspending-chains, which connect the outer joint of the lower coupling-link to the head of the draw-bar, and which serve to keep the links off the ground.

The link is raised for coupling by turning the barrel, already mentioned, and winding the lifting-chains upon it. The links then straighten, the rule-like joints becoming stiff when they come to the end of their travel. The links rise together somewhat over the horizontal position, and so that the ends of the links are above the level of the hooks which they are to engage. They are stopped in this position ready for coupling by a stop in the joint connecting the upper link with the draw-bar head, and they are retained by a pawl which engages with the teeth of a ratchet-wheel on the same axis with the barrel.

The liberation of the coupling-links so that they may drop down onto the hooks is effected when the buffers of the carriages or vehicles are brought together. There is a sliding bar in connection with each buffer-head, and the bar has a tappet upon it. When the bar is driven in by the compression of the buffer-springs, this tappet acts against an arm on the same axis with the retaining-pawl and lifts the pawl; hence directly the carriages are brought together the barrel by which the coupling-links are held ready for coupling is released, the chains at once fall slack, and the coupling-links fall onto the hooks with which they are respectively to engage.

In uncoupling, the links are lifted by winding the chains on the barrel; but to enable this to be done it is necessary first to slacken the springs of the draw-bar. The arrangements for this are as follows: The draw-bar passes through a sleeve within which a screw-thread is cut, and the draw-bar itself has a corresponding screw-thread upon it. This sleeve is able to slide through the central boss of a worm-wheel, which is held in a suitable bearing and engages with a worm on a horizontal axis, which can be turned from the side of the carriage. The fore part of the draw-bar is square, and it passes through a guide of corresponding form on the carriage or vehicle, so that it is unable to turn. Between the guide and the sleeve there is a helical spring surrounding the stem of the draw-bar, so that it will be seen that by turning the worm, already mentioned, the sleeve can be made to advance along the screw-thread upon the draw-bar, and to compress to any desired extent this spring, which resists the outward movement of the draw-bar; or, by rotating the worm in the contrary direction, the tension of the spring can be relaxed and the draw-bar head allowed to advance sufficiently to admit of the coupling-links being lifted from the hooks.

The draw-bar springs operate in the usual manner to permit play of the draw-bars while the train is running, maintaining approximately uniform tension and preventing the sudden application of heavy strains. Single coupling links and hooks may be arranged in like manner.

In order that my said invention may be most fully understood and readily carried into effect, I will proceed to describe the drawings hereunto annexed.

Figure 2:
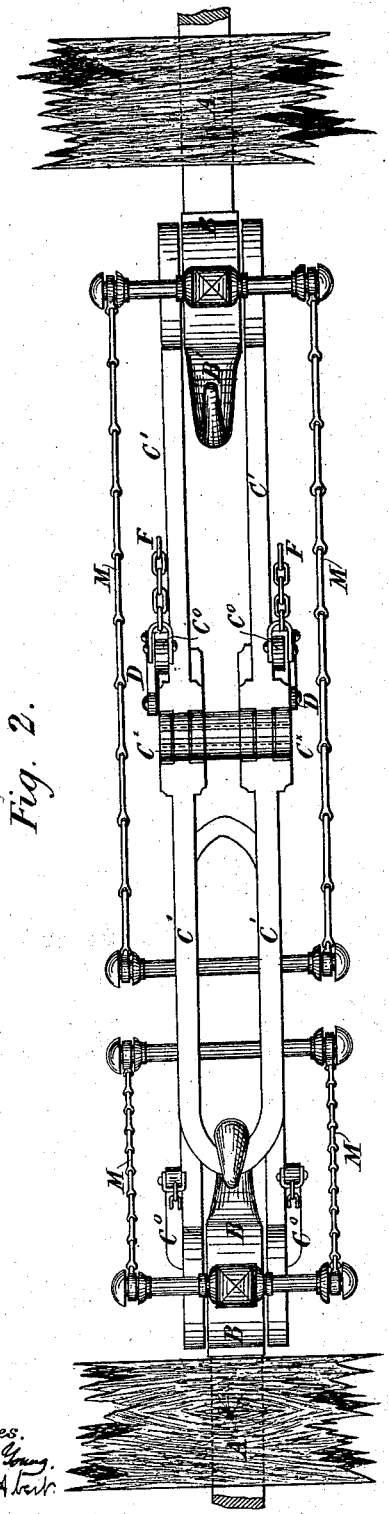
Figure 4:
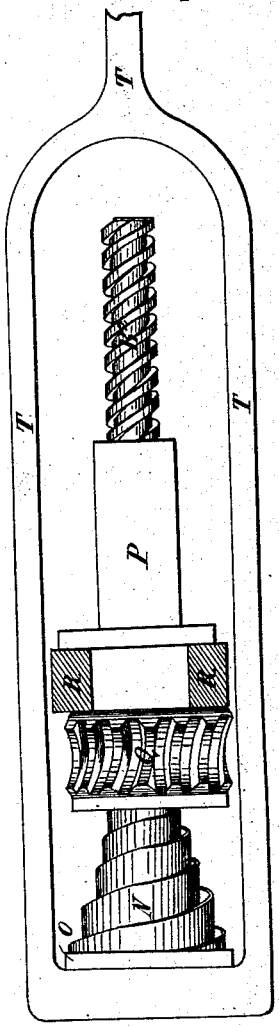
Figure 3:
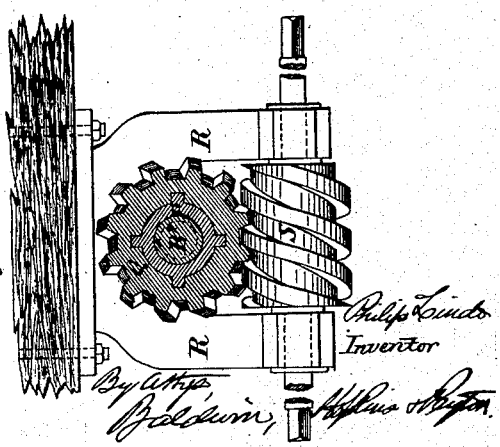

In the drawings, Figure 1 is a side elevation, and Fig. 2 is a plan, of apparatus for coupling railway-carriages arranged in accordance with my invention. Fig. 3 is a section taken on the line 1 1 in Fig. 1, and Figs. 4 and 5 show in plan a modified arrangement in connection with the draw-bar.

A A represent the frame of the carriages. In Figs. 1 and 2 portions of two carriages are shown in the relative positions they occupy when coupled.

B B are the draw-bar heads, each with two hooks, B' B'.

C' $C^2$ C' $C^2$ are the pairs of links connected with the draw-bar heads, one pair to each. Only one pair of coupling-links is in use at a time. The other pair hangs down out of the way. This is clearly represented in Fig. 1, where the links of the carriage to the right of the figure are in use and those of the carriage to the left are out of use. The links C' $C^2$ are each in two parts jointed together at $C^2$, and the joint is made like the joint of a rule—that is to say, it admits of the parts folding in one direction, but the joint is stiff in the other direction when the two parts of the link are aligned.

D is a slotted connecting-piece which attaches the two links forming a pair, the one to the other, but admitting of a certain amount of freedom, so that the links in rising and falling may turn freely about the joints connecting them with the head of the draw-bar.

E is a barrel the axis of which is carried in bearings upon the frame of the carriage immediately over the head of the draw-bar. The axis extends to the side of the carriage, and there receives a handle, by which it can be turned.

Connecting with the barrel are two chains, F F, which can be wound upon it by turning the barrel. These chains pass to lugs $C^0$ upon the links C', so that when the chain is wound up the links are raised until they are stopped by the projections $B^x$ on the draw-bar head. A pawl, G, dropping into ratchet-teeth upon the barrel E, prevents the return of the barrel and sustains the links in the position to which they are raised.

H is an arm on the same axis with the pawl, and I is a tappet for acting upon this arm. It is attached to a rod, J, which is able to slide in a bearing carried upon the spring-box K of the buffer L. When the buffers of two carriages come together, this sliding rod, with its tappet, is moved inward toward the frame of the carriage with which it is connected, and, acting against the arm H, it lifts the pawl out of the ratchet-teeth upon the barrel E. The coupling-links then immediately fall and engage simultaneously with the hooks on the head of the opposite draw-bar. The links C and C', when uncoupled and hanging down, are supported from the head of the draw-bar by other chains, M M, as is indicated in Fig. 1.

The stem of the draw-bar is square in section, and it passes in the usual way through a guide of corresponding form on the frame of the carriage, which prevents the bar from turning, though it can move out and in.

N is the draw-bar spring surrounding the draw-bar. It abuts at one end on a disk, O, supported by the frame of the carriage, and at the other against the flanged end of a sleeve, P.

The draw-bar has a screw-thread cut upon it at $B^2$, and the sleeve, when it is turned, works as a nut upon this thread. The sleeve passes through the center of a worm-wheel, Q, which is carried in a bearing on a support, R, fixed beneath the platform of the carriage. The worm-wheel engages with a worm, S, carried upon the same support R, and this worm can be turned from the side of the carriage by means of a handle applied to its axis. When the sleeve is thus rotated (for the worm-wheel carries the sleeve around with it) it advances or retires along the screw-thread $B^2$ on the draw-bar, and so draws the head of the draw-bar home and compresses the spring N when the movement is in a direction to produce this effect. For uncoupling, the movement is in the other direction. It releases the spring from pressure, and allows the draw-bar head to protrude sufficient to allow of the coupling-links, when the carriages are at rest, being lifted clear from the hooks with which they engage.

The helical spring N may be replaced by a spring of other form or by an india-rubber spring. If it be desired that the draw-bar should be continuous from end to end of the carriage—that is to say, that the two draw-bar heads should be connected independently of the carriage-frame—this may readily be done in the manner indicated by Fig. 4, where T is a stirrup, which receives the thrust of the spring N. It is connected by a bar, T', with a similar stirrup at the other end of the carriage, which in like manner receives the thrust of the spring N, which is there situate.

Having now particularly described and ascertained the nature of my said invention, and in what manner the same is to be performed, I declare that what I claim is—

1. The improved coupling consisting of a pair of rule-jointed links connected with the head of the draw-bar and a barrel with chains lifting the links to a position to drop onto hooks on the opposite draw-bar head, substantially as described.

2. The apparatus for effecting the automatic liberation of the coupling-links, enabling them to engage with the hooks of the draw-bar, consisting of a sliding rod operated by the buffer when driven in and lifting a retaining-pawl, substantially as described.

3. The combination of the rule-jointed link or links connected with the head of the draw-bar, the barrel with pawl and chains lifting and retaining the link or links in a position to drop onto the hook or hooks on the opposite draw-bar head, and the sliding rod releasing the said pawl when two carriages are brought together, substantially as described.

4. The apparatus for adjusting the draw-springs, consisting of a worm and worm-wheel and a sleeve on which the draw-spring abuts, the said sleeve sliding through the wheel and working as a nut on a screw-thread on the draw-bar, substantially as described.

PHILIP LINDO.

Witnesses:
ARTHUR RICHARD SKERTEN,
JNO. DEAN,
 *Both of 17 Gracechurch Street, London.*